US008340974B2

(12) United States Patent
Zurek et al.

(10) Patent No.: US 8,340,974 B2
(45) Date of Patent: Dec. 25, 2012

(54) DEVICE, SYSTEM AND METHOD FOR PROVIDING TARGETED ADVERTISEMENTS AND CONTENT BASED ON USER SPEECH DATA

(75) Inventors: Robert A. Zurek, Antioch, IL (US); James P. Ashley, Naperville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 835 days.

(21) Appl. No.: 12/346,019

(22) Filed: Dec. 30, 2008

(65) Prior Publication Data

US 2010/0169091 A1 Jul. 1, 2010

(51) Int. Cl.
*G10L 21/00* (2006.01)
*G10L 11/00* (2006.01)
*G10L 15/00* (2006.01)
*G10L 17/00* (2006.01)

(52) U.S. Cl. ............ 704/275; 704/270; 704/270.1; 704/231; 704/246

(58) Field of Classification Search .................. None
See application file for complete search history.

(56) References Cited

U.S. PATENT DOCUMENTS

| 5,953,701 | A | 9/1999 | Neti et al. | |
|---|---|---|---|---|
| 6,415,257 | B1 * | 7/2002 | Junqua et al. | 704/275 |
| 6,542,200 | B1 * | 4/2003 | Barcy et al. | 348/468 |
| 6,636,590 | B1 * | 10/2003 | Jacob et al. | 379/114.05 |
| 6,638,217 | B1 | 10/2003 | Liberman | |
| 6,944,593 | B2 * | 9/2005 | Kuzunuki et al. | 704/270.1 |
| 7,096,185 | B2 * | 8/2006 | Reichardt et al. | 704/275 |
| 7,171,360 | B2 * | 1/2007 | Huang et al. | 704/245 |
| 7,174,029 | B2 | 2/2007 | Agostinelli et al. | |
| 7,395,959 | B2 * | 7/2008 | Kirkland et al. | 235/380 |
| 7,949,526 | B2 * | 5/2011 | Ju et al. | 704/246 |
| 2003/0046080 | A1 * | 3/2003 | Hejna, Jr. | 704/270 |
| 2004/0193426 | A1 * | 9/2004 | Maddux et al. | 704/275 |
| 2004/0260550 | A1 * | 12/2004 | Burges et al. | 704/259 |
| 2005/0027539 | A1 * | 2/2005 | Weber et al. | 704/275 |
| 2010/0158213 | A1 * | 6/2010 | Mikan et al. | 379/88.14 |

* cited by examiner

*Primary Examiner* — Jesse Pullias
(74) *Attorney, Agent, or Firm* — Stewart M. Wiener

(57) ABSTRACT

An aspect of the present invention is drawn to an audio data processing device for use by a user to control a system and for use with a microphone, a user demographic profiles database and a content/ad database. The microphone may be operable to detect speech and to generate speech data based on the detected speech. The user demographic profiles database may be capable of having demographic data stored therein. The content/ad database may be capable of having at least one of content data and advertisement data stored therein. The audio data processing device includes a voice recognition portion, a voice analysis portion and a speech to text portion. The voice recognition portion may be operable to process user instructions based on the speech data. The voice analysis portion may be operable to determine characteristics of the user based on the speech data. The speech to text portion may be operable to determine interests of the user.

20 Claims, 2 Drawing Sheets

DEVICE, SYSTEM AND METHOD FOR PROVIDING TARGETED ADVERTISEMENTS AND CONTENT BASED ON USER SPEECH DATA

BACKGROUND

Media devices such as set-top boxes, DVD players and digital video recorders are connected to televisions in many households. A media device may be controlled via a remote control device. Conventional remote control devices may have buttons to choose commands to control the media device. Remote control devices typically communicate with the media device using infrared communication or radio frequency communication. Advances in voice recognition technology may allow for media devices to additionally be controlled via user spoken commands.

During use, media devices may display advertisements. In some media devices, these advertisements are general and may or may not be appropriate to the users watching. In other media devices, the programs that are viewed by the users are used to create a profile for the user that can select advertisements based on the users' viewing habits. In other media devices, users may be asked to create a profile. The user would be asked questions to determine preferences and the user's answers would be saved in the profile. The user profiles would then be used to select specific advertisements or content suggestions that are targeted to that user based on that user's profile.

Conventional methods for creating a user profile are often intrusive and require a user to answer questions the user may find to be inconvenient or may be unwilling to answer truthfully. A user of such a device may find the questions to get in the way of simple use of the device. A user also may not be completely honest when answer the questions if they are trying to get through the questions quickly or are embarrassed by an honest answer. User profiles with flawed or incomplete information may result in advertisements or content suggestions that are targeted toward the user profile that are not of interest to the user.

What is needed is a media device that may be controlled via user spoken commands and can create user profiles, for use in targeting advertisements or suggesting content, without inconveniencing the user with a lengthy questionnaire.

BRIEF SUMMARY

In accordance with an aspect of the present invention, a media device may be controlled via user spoken commands and may create user profiles, for use in targeting advertisements or recommending content, without inconveniencing the user with a lengthy questionnaire.

An aspect of the present invention is drawn to an audio data processing device for use by a user to control a system and for use with a microphone, a user demographic profiles database and a content/ad database. The microphone may be operable to detect speech and to generate speech data based on the detected speech. The user demographic profiles database may be capable of having demographic data stored therein. The content/ad database may be capable of having at least one of content data and advertisement data stored therein. The audio data processing device includes a voice recognition portion, a voice analysis portion and a speech to text portion. The voice recognition portion may be operable to process user instructions based on the speech data. The voice analysis portion may be operable to determine characteristics of the user based on the speech data. The speech to text portion may be operable to determine interests of the user.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
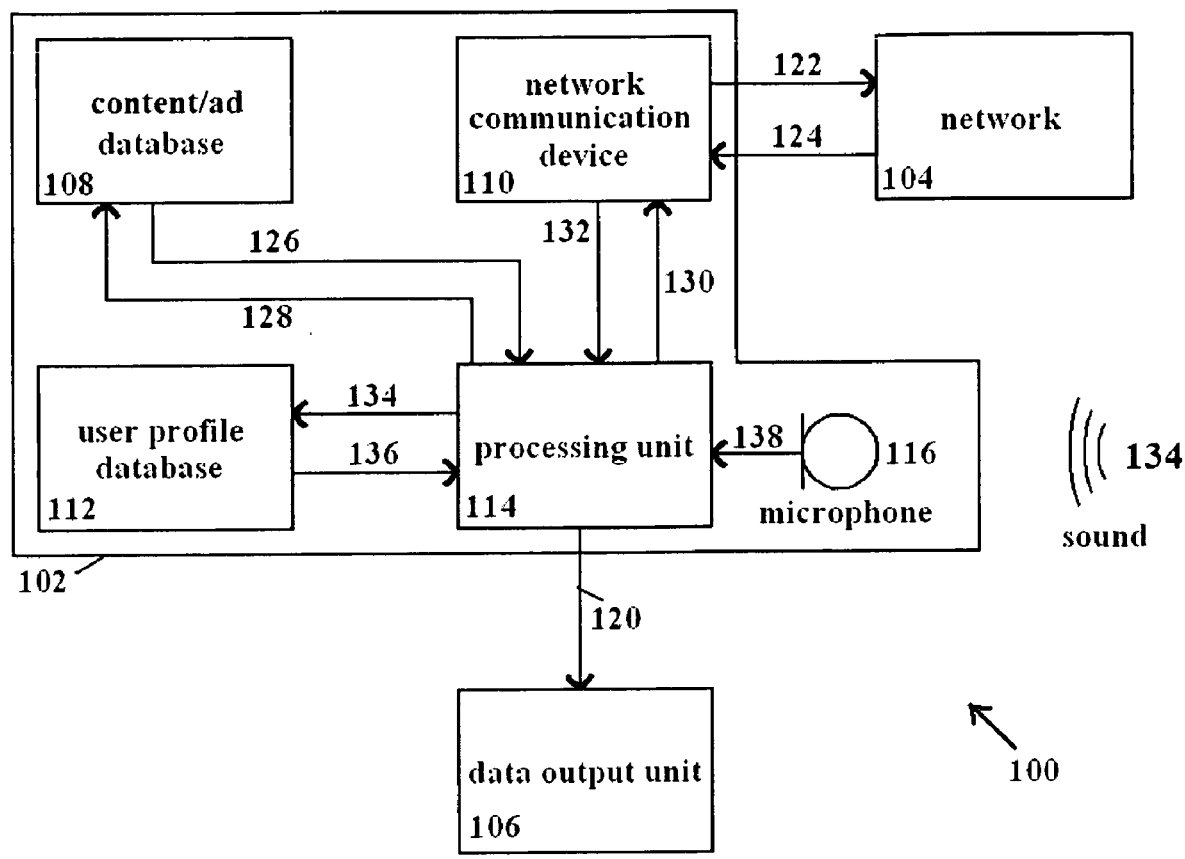
FIG. 1 illustrates an exemplary media device, in accordance with the present invention.

In accordance with an aspect of the present invention, a media system, which is operable via a user's voice command, may analyze the user's speech to determine personal identity information, non-limiting examples of which include gender, age, emotional state, and areas of interest. The determination of gender, age and emotional state may be based on voice analysis of the recorded commands. The determination of areas of interest may be based on keywords within the voice command.

The personal identity information acquired on a user may then be used in a targeted selection of advertising material or suggested content based on the user's demographics.

An exemplary embodiment of a media system in accordance with the present includes a media playback device, non-limiting examples of which include a set-top box, networked portable media player, or media enabled wireless phone, that includes a voice activated user interface. The media playback device may contain a memory operable to buffer incoming audio data from the user. The media playback device may additionally contain a voice activity detector (VAD) that is capable of determining whether incoming audio is speech or other background noise. The data that is stored in the memory may be used in a plurality of processing operation paths.

An exemplary primary processing operation path may be the speech recognition operation path, which determines the user's desired control of the device. This control information may be passed along to control circuitry within the device. Such control circuitry may be capable of adjusting playback parameters of the device, non-limiting examples of which include play, pause, volume level, etc. Further, such control circuitry may be capable of navigating or selecting content with the device, such as searching for content within a database.

An exemplary second processing operation path may be a voice analysis path, which may determine characteristics of the user that are useful for demographic purposes. Information such as the user's gender, age, and emotional temperament may be determined from this type of analysis. Spectral analysis, stress analysis and layered voice analysis are well developed technologies that are used in areas such as law enforcement, security and fraud investigation.

An exemplary third processing operation path may be a voice recognition/speech to text operation path that breaks down the user's speech into words, and then identifies keywords such as nouns to determine the interests of the user. This third processing operation path may additionally use the data from the primary processing operation path analyzed for keywords.

The voice analysis path and the voice recognition/speech to text path mentioned above may be used to create a demographic profile of the user, which may then used to display targeted advertising to the user, or to recommend content that might be of interest to the user. A database of advertisement content that is pertinent to the user's demographic profile may be accessed. This database could exist locally on the device or be remotely accessible via a network. In an example embodiment, wherein the database is local, it may be updated regularly via the device's network connection.

In an exemplary embodiment in accordance with the present invention, a user may ask an exemplary system to find a specific genre of media, such as "science fiction movies." In accordance with one aspect of the present invention, the system may determine from the user's voice print that the user is a twelve year old male. The system may then provide movies that are appropriate to a child or preteen, and may further list advertisements that are geared towards a preteen male interested in science fiction. Non-limiting examples of such advertisements include video games, preteen science fiction books, and science fiction related toys. If, for example, the system may determine from the user's voice print that the user is a middle aged woman, the system may list advertisements that are geared towards a middle aged woman interested in science fiction. As such, the system may additionally list advertisements that are geared towards a middle aged woman, rather than a general audience.

In accordance with another aspect of the present invention, an exemplary system may use voice printing to identify an individual user and that user's likes, dislikes and moods. Individual profiles may be set up as each new user addresses the system. Demographic fields and interests fields may be updated each time that user addresses the system. In the example given above, the twelve year old male may frequently consume science fiction content. If, in this example, the male one day asks for a comedy movie, an example system may suggest a science fiction comedy movie because the user is requesting a comedy and his interests as listed in an interest field include science fiction. The example system may additionally provide advertisements for science fiction comedy books, movies or video games.

In accordance with another aspect of the present invention, an exemplary system may monitor conversation in a room, in addition to monitoring the command inputs, to determine if more than one user is in the room, and tailor advertisements to the entire group. The exemplary system may determine common interests or characteristics of the entire group in the room or the exemplary system may alternate between advertisements geared toward each of the people in the room.

In exemplary embodiments and aspects as discussed above, a system in accordance with the present invention may allow for the collection of personal information of a user without active input from the user, or without the user's knowledge of the personal information collection. A system in accordance with the present invention may provide useful information that is acquired in normal demographic profile creation, e.g., information acquired for television or radio ratings, without: 1) the need for the user to be inconvenienced with actively responding to questions; and 2) providing a more accurate representation of the user's actual demographic information, by avoiding the skewing of results that would occur when a user provides less than truthful answers.

An exemplary method for using voice recognition to control a media device and to demographically profile a user in accordance with an aspect of the present invention will be described with reference to FIGS. 1-2.

FIG. 1 illustrates an exemplary system in accordance with an aspect of the present invention. In the figure, system 100 includes a media device 102, a network 104 and a data output unit 106. Media device 102 comprises a content and advertisement database, which is hereinafter referred to as the content/ad database 108, a network communication portion 110, a user profile database 112, a processing unit 114 and a microphone 116.

Media device 102 may be any device that is capable of generating media data 120 for a user. Non-limiting examples of media device 102 include a video device, an audio device and a video/audio device.

Data output unit 106 may be any device that is capable of providing media data 120 to the user. Non-limiting examples of data output unit 106 include a video display, speaker, and a video display with a speaker. Data output unit 106 may be a separate device from media device 102 or may be combined with media device 102 as a single unit.

Network communication portion 110 may be any device that is capable of at least one of sending data 122 to network 104 and receiving data 124 from network 104.

Content/ad database 108 is in communication with processing unit 114. Processing unit 114 is operable to send at least one of content data and advertisement data, herein after referred to as content/ad data 128, to content/ad database 108. Content/ad database 108 is operable to store data corresponding to content/ad data 128. Further, processing unit 114 is operable to retrieve at least one of content data or advertisement data, herein after referred to as content/ad data 126, from content/ad database 108.

Content/ad data 128 is used to create content/ad database 108 by any known method. Content/ad data 128 and content/ad data 126 may include, but is not limited to still and video advertisements or commercials, demographic classification, and genre information. Content/ad data 126 may be used to target advertisements to users based on user demographics and user interests. Content/ad data 128 may be created by vendors or advertising companies and then used to show advertisements to those most likely to be swayed by the advertisement data.

For example, a company, in this example a shoe company, has an advertisement for a men's running shoe. Associated advertisement data contains the advertisement for the running shoe to be displayed by media device 102 and appropriate demographic and genre information. In this example, the demographic information would be an adult male, the type of person that would buy the shoe. Similarly, if the advertisement resembles science fiction or comedy, then the advertisement would contain associated genre information.

A second example may be an advertisement for a dramatic movie with adult content. The associated advertisement would have demographic information to associate the advertisement with men and women who would be of appropriate age for the movie. The advertisement would also have genre information classifying the advertisement as a dramatic movie so that users who like dramatic movies, or are searching for dramatic movies, may be shown the advertisement.

User profile database 112 is in communication with processing unit 114. Processing unit 114 is operable to send user profile data 134 to user profile database 112. User profile database 112 is operable to store data corresponding to user profile data 134. Further, processing unit 114 is operable to retrieve user profile data 136 from user profile database 112.

A user profile contains information used to differentiate between users of media device 102, demographic information about the user, and preferences of the user. Users may be differentiated via any known method, including but not limited to, voice print identification. The corresponding information, in the case of voice print identification a voice print, would be stored in the user profile. Additionally, users may be differentiated using the demographic information also stored in the user profile, which may come from voice analysis, non-limiting examples of demographic information include but are not limited to age, gender, and economic status. Non-limiting examples of user preference information include but are not limited to user likes and dislikes of genres such as action, sports, comedy, science fiction, fantasy, and dramatic movies and hobbies such as crafts, fishing, video games, and reading.

An exemplary user profile may represent a first user and can identify that user with a voice print. The user profile may also contain information describing this user as a married, elderly male who likes comedy, sports, and woodworking and dislikes dramas, pets, and camping.

An example user profile may only include a small amount of profile information, specifically, the profile could be limited to only gender. A more extensive example profile may have a much greater amount of profile information including but not limited to the categories listed above. The more extensive profile allows for advertisements to be targeted to very specific demographics than the simple profile, therefore the more extensive profile allows the user to see more advertisements they are likely to be affected by and less advertisements that are unrelated to the user.

Network communication portion 110 is in communication with processing unit 114. Processing unit 114 is operable to send data 130 to network communication portion 110. Additionally, network communication portion 110 is operable to send data 132 to processing unit 114.

Microphone 116 is in communication with processing unit 114. Microphone 116 is operable to detect sound 134 and send audio data 138, based on sound 134, to processing unit 114. In some embodiments, microphone 116 may consist of a single microphone element. In other embodiments, microphone 116 may comprise a plurality of microphone elements, wherein sound 134 from multiple sources can be separated prior to voice recognition or speech recognition processing. In some embodiments, processing of sound 134 into separate signals can occur in microphone 116. In other embodiments, processing of sound 134 into separate signals may include separating the signals and then processing via multiple inputs in processing unit 114, prior to the voice recognition or speech recognition stages.

Media device 102 receives sound 134 via microphone 116. Microphone 116 converts sound 134 to audio data 138 and sends audio data 138 to processing unit 114. Processing unit 114 is operable to process audio data 138 via one or more of three processing paths as described above, a speech recognition path, a voice analysis path, and a voice recognition/speech-to-text path.

Audio data 138 processed via the speech recognition path may be used to determine the user's desired control of media device 102. Non-limiting examples of this control information include commands to play, pause, fast-forward, rewind, or search for content. The control information may be used to control sending of media data 120 to data output unit 106.

Audio data 138 processed via the voice analysis path may generate characteristic information about the user. This characteristic information is used to distinguish between user profiles stored in user profile database 112. The characteristic information is used to search user profile database 112 for a user profile that has matching characteristic information. If there is a user profile in user profile database 112 with characteristic information that matches the characteristic information processed from audio data 138, the profile found is a matching user profile. If no such profile is found, a matching user profile does not exist in user profile database 112 and a new user profile may be created, for example, as discussed above. Non-limiting examples of characteristic information include information about age, gender, spectral content and emotional temperament.

Audio data 138 processed via the voice recognition/speech-to-text path may be used to determine user preferences. User preferences are stored as additional data in a user profile determined by the voice analysis path above.

Content/ad database 108 may periodically refresh at least one of the content and the advertisements stored within. When an update is performed, network communication portion 110 communicates with network 104 to obtain at least one of new content and new advertisements. The new content and new advertisements are communicated to processing unit 114, which then uses the new content and new advertisements to update content/ad database 108. Information from all of the profiles in user profile database 112 can be utilized to determine which new advertisements are downloaded from network 104.

An exemplary method of operating media device 102 will be now described with reference to FIG. 2.

First, a user speaks a command (S200), creating sound 134, intended to control media device 102. Microphone 116 converts sound 134 to audio data 138 (S202). Audio data 138 is processed via a speech recognition path (S204), as defined above, by processing unit 114. Additionally, audio data 138 is processed via a voice analysis path, as defined above, by processing unit 114 to determine the user's age, gender, and emotional state (S206).

Following to step S204, processing unit 114 separates commands in audio data 138 from keywords in audio data 138 (S208). The commands are then used by processing unit 114 to control media device 102 (S212). Media device 102 then proceeds to display content to data output unit 106 in accordance with the command specified (S220). During display of content, media device 102 will check to see if it is time to display an advertisement (S228). If it is time to display an advertisement, an appropriate advertisement is retrieved from content/ad database 108 and displayed to data output unit 106 (S226). If it is not time to display a commercial, media device 102 continues to display content to data output unit 106 in accordance with the previously specified command (S224). Steps S224 and S226 return to step S228 after they are completed.

Returning to step S206, the user's age, gender, and emotional state are compared to stored profiles in user profile database 112 to determine if a profile already exists for the user on media device 102 (S210). If there is not a matching profile on media device 102, a new profile is created (S216). The new profile may have data stored therein that corresponds to the user's age, gender, and emotional state. The profile may have additional data stored therein that corresponds to non-limiting example information, which includes keywords. Such additional data may initially be non-existent and may be updated in future steps. The profile may be stored in user profile database 112 and may be used for comparison in future searches for user profiles.

If there is a matching profile on media device 102 or once a profile is created in step S216, also following from step S208, media device 102 checks the user profile to see if the keywords found in step S208 are new or are already associated with the user profile (S214). The keywords found in step S208 are used to update the user profile (S218). Next, processing unit 114 combines keyword information stored in the user profile with the content being displayed to data output unit 106 as determined in step S220, to determine advertising that is appropriate and relevant to the user (S222) for use in step S226.

Figure 2:
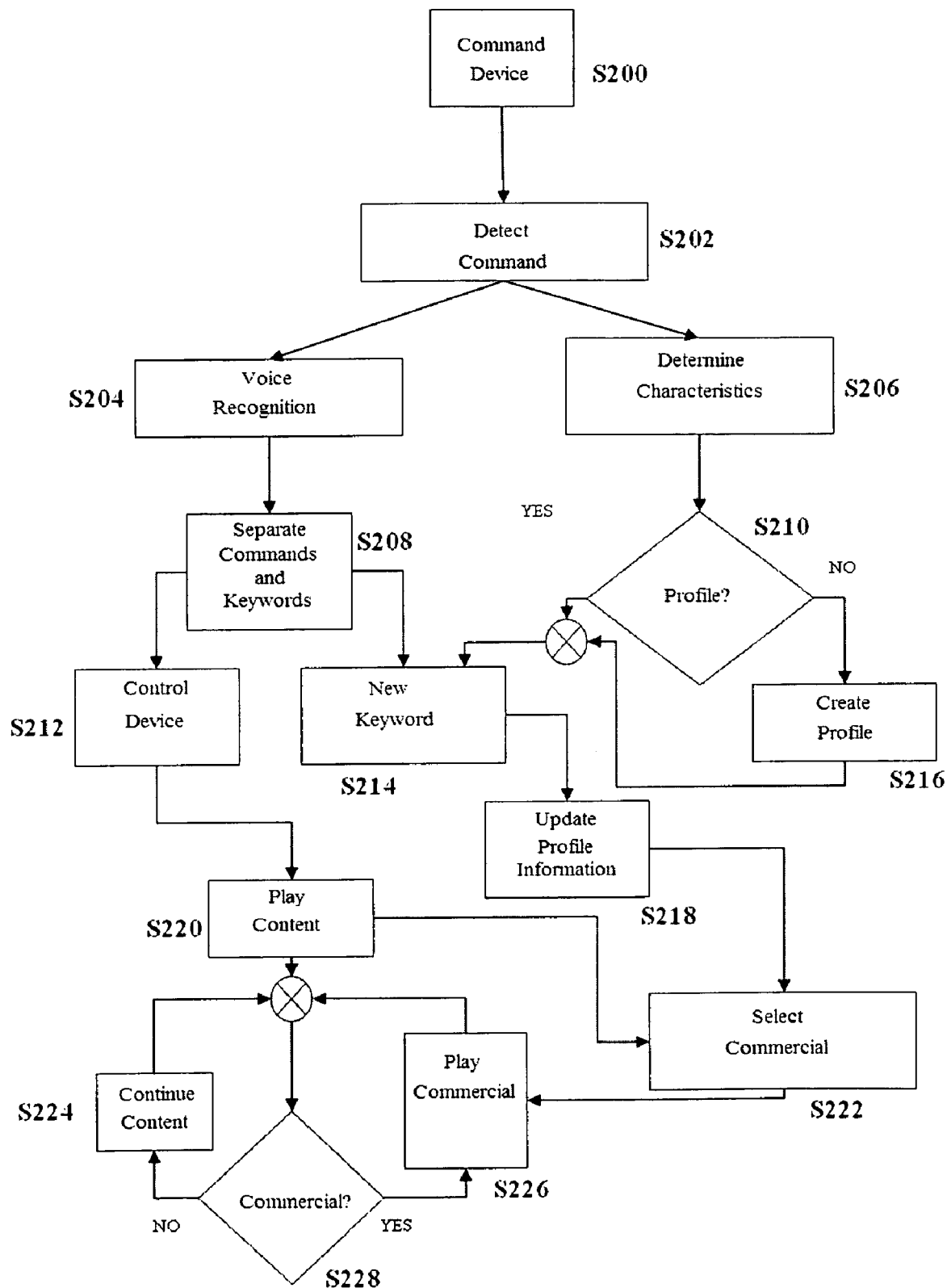
FIG. 2 illustrates an exemplary process detailing operation of an exemplary media device, in accordance with the present invention.

The process described in FIG. 2 continues the loop defined by steps S224, S226, and S228 until a new command is issued, where the process then returns to step S200.

In the above embodiments, media device 102 includes content/ad database 108 and user profile database 112. However, in other embodiments, at least one of content/ad database 108 and user profile database 112 are not included in media device 102 but are accessible by media device 102.

The above embodiments detail a media device operable via audio commands. Examples of such a media device include but are not limited to a cable or satellite set-top box, DVD player, a Blu-ray disc player, a media enabled phone or a digital video recorder. During operation, the media device interprets sound input to the device through a microphone via voice and speech recognition. Words spoken by people near the media device are processed for content and characteristics.

The voice recognition aspect of the media device converts input audio into text or other word representations to be interpreted by the media device. This text may be interpreted as commands, for example, if a person near the media device said "play movie," the device would being playback of a movie. The text may also be interpreted as keywords. These keywords provide information for the user profile. Specifically, the keywords help to define the likes and dislikes of the user as well as other preference information that is stored in the user profile.

The speech recognition aspect of the media device uses properties of the input audio to determine the specific user uttering the words and characterize the user in the device. Characteristics that may be used to define a user include but are not limited to demographic information such as age and gender as well as vocal characteristics such as pitch and speed of voice. The characteristics distinguish between different user profiles on the media device so that separate user profile information can be used to track the preferences of several users of the media device.

User profiles created and updated through the voice and speech recognition are used to target advertisements to the current user. For a single user, the device uses the corresponding user profile to target appropriate advertisements to that user.

The media device is capable of continuously monitoring all of the audio near the media device. The monitoring allows for the media device to track and respond to the commands and keywords uttered by several users at the same time. When the media device senses that multiple users are nearby, it can use the user profiles associated with all of the users nearby to create a group profile. This group profile combines the information of the different users to tailor the advertisements shown to the entire group watching the media device instead of only the single user.

An example media device such as a set-top box capable of playing on-demand content, in accordance with aspects of the present invention, will now be described. Suppose two people, Doug and Robert, are in a room watching content using the media device. While they are watching the content on the media device, Doug and Robert are having a conversation. Perhaps they are discussing a recent football game. Doug may say "Did you see the Giants play the Eagles last week?" The media device will be monitoring the conversation and convert Doug's speech to keywords. In addition, the media device will recognize that Doug is a male between the ages of 25 and 35. The device will then update Doug's profile to include football as something Doug likes and that Doug is a male between 25 and 35 years old. Robert might reply "Of course, the Giants are my favorite team." The media device will be monitoring the conversation and convert Robert's speech to keywords. In addition, the media device will recognize that Robert is a male between the ages of 45 and 55. The device will then update Robert's profile to include both football and the New York Giants as things that Robert likes and that Robert is a male between 45 and 55 years old.

Now, continuing the example, Doug wants to play an on-demand movie. Doug would say "find action movies" and the media device would display a list of action movies selected based on the profile stored in the media device for Doug. Doug would then select the movie he wanted to play by saying, "play movie two." The media device will convert Doug's speech to a command. The content the media device is displaying will change to the second movie on the suggested play list, and Doug and Robert can watch the new content as well as continue to have a conversation. The conversation will be monitored by the device and when Doug and Robert express their preferences, the media device will update the associated user profiles of Doug and Robert appropriately.

As Doug and Robert continue watching the media device, the media device may determine that it should show an advertisement. The media device then accesses an advertisement database to determine an appropriate advertisement to display. The device knows that both Doug and Robert are watching the media device and uses both profiles to determine an advertisement to display. Earlier, Doug and Robert were discussing football and both of their profiles indicate that they like football, so the media device may choose a football related advertisement to display, perhaps an advertisement for the NFL Network.

As discussed-above, in accordance with an aspect of the present invention, a media device may be controlled via user spoken commands. The commands may be interspersed within other dialog. From the dialog, a media device may additionally create user profiles that may be used targeting specific advertisements to a user. As such, the media device may target specific advertisements without inconveniencing the user with a lengthy questionnaire.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. An audio data processing device for use by a plurality of users to control a system and for use with a microphone, a user demographic profiles database and a content database, the microphone being operable to detect speech and to generate a speech data based on the detected speech, the user demographic profiles database being capable of having demographic data stored therein, the content database being capable of having at least one of content data and advertisement data stored therein, said audio data processing device comprising:

a voice recognition portion operable to process user instructions from a first user of the plurality of users, based on a command speech data that comprises at least one command by the first user for controlling the audio data processing device;

a voice analysis portion operable to determine characteristics of the first user based on the speech data; and a speech to text portion operable to determine interests of the first user based on a conversational speech data that comprises at least a portion of a monitored conversation between the first user and at least a second user of the plurality of users, and further wherein the portion does not comprise a command by the first user for controlling the audio data processing device.

2. The audio data processing device of claim 1, wherein said voice analysis portion is operable to perform at least one of spectral analysis, stress analysis and layered voice analysis on a portion of the speech data.

3. The audio data processing device of claim 2, wherein said voice analysis portion is further operable to determine at least one of gender, age and emotional temperament of the first user based on the performance of at the least one of spectral analysis, stress analysis and layered voice analysis on the portion of the speech data.

4. The audio data processing device of claim 1, wherein said speech to text portion is further operable to identify keywords within the portion of the speech data.

5. The audio data processing device of claim 1,
wherein said voice recognition portion is further operable to process user instructions from the first user and the second user,
wherein said voice analysis portion is further operable to determine characteristics of the first user and the second user, and
wherein said speech to text portion is further operable to determine interests of the first user and the second user.

6. An audio data processing system for use by a plurality of users to control a device, said audio data processing system comprising:

a microphone operable to detect speech from a first user of the plurality of users and to generate speech data based on the detected speech;

a user demographic profiles database capable of having demographic data stored therein;

a content database being capable of having at least one of content data and advertisement data stored therein;

a voice recognition portion operable to process user instructions from the first user, based on a command speech data that comprises at least one command by the first user for controlling the device;

a voice analysis portion operable to determine characteristics of the first user based on the speech data; and a speech to text portion operable to determine interests of the first user based on a conversational speech data that comprises at least a portion of a monitored conversation between the first user and at least a second user of the plurality of users, and further wherein the portion does not comprise a command by the first user for controlling the device.

7. The audio data processing system of claim 6, wherein said voice analysis portion is operable to perform at least one of spectral analysis, stress analysis and layered voice analysis on a portion of the speech data.

8. The audio data processing system of claim 7, wherein said voice analysis portion is further operable to determine at least one of gender, age and emotional temperament of the first user based on the performance of at the least one of spectral analysis, stress analysis and layered voice analysis on the portion of the speech data.

9. The audio data processing system of claim 6, wherein said speech to text portion is further operable to identify keywords within the portion of the speech data.

10. The audio data processing system of claim 6, further comprising a display unit operable to display a portion of the at least one of content data and advertisement data stored within said content database.

11. The audio data processing system of claim 10, further comprising a processing portion operable to retrieve the portion of the at least one of content data and advertisement data based on the determined characteristics of the first user.

12. The audio data processing system of claim 11, wherein the processing portion is operable to retrieve the portion of the at least one of content data and advertisement data based further on the determined interests of the first user.

13. The audio data processing system of claim 12, further comprising a processing portion operable to retrieve the portion of the at least one of content data and advertisement data based on the determined interests of the first user.

14. The audio data processing system of claim 10, further comprising a processing portion operable to retrieve the portion of the at least one of content data and advertisement data based on a portion of the demographic data stored within said user demographic profiles database.

15. The audio data processing system of claim 6,
wherein said voice recognition portion is further operable to process user instructions from the first user and the second user,
wherein said voice analysis portion is further operable to determine characteristics of the first user and the second user, and
wherein said speech to text portion is further operable to determine interests of the first user and the second user.

16. A method of processing audio data, said method comprising:

generating speech data from received audio data comprising speech and background noise;

accessing a user demographic profiles database having demographic data stored therein;

accessing a content database having at least one of content data and advertisement data stored therein;

processing user instructions from a first user of a plurality of users, based on a command speech data, wherein the command speech data comprises at least one command by the first user for controlling the audio data processing device;

determining characteristics of the first user based on the speech data; and determining interests of the first user based on a conversational speech data that comprises at least a portion of a monitored conversation between the first user and at least a second user of the plurality of users, and further wherein the portion does not comprise a command by the first user for controlling the device.

17. The audio data processing method of claim 16, wherein said determining characteristics of the first user comprises performing at least one of spectral analysis, stress analysis and layered voice analysis on a portion of the speech data.

18. The audio data processing method of claim 17, wherein said determining characteristics of the first user further comprises determining at least one of gender, age and emotional temperament of the first user based on said performing at least one of spectral analysis, stress analysis and layered voice analysis on the portion of the speech data.

19. The audio data processing method of claim 16, wherein said determining interests of the first user comprises identifying keywords within the portion of the speech data.

20. The audio data processing method of claim 16,
wherein said processing user instructions comprises processing the first user's instructions and processing the second user's instructions,
wherein said determining characteristics of the user comprises determining characteristics of the first user and determining characteristics of the second user, and
wherein said determining interests of the user comprises determining interests of the first user and determining interests of the second user.

* * * * *